Oct. 28, 1947.  W. J. JOYCE  2,429,692
METHOD OF MAKING OPHTHALMIC LENSES
Filed Sept. 22, 1943
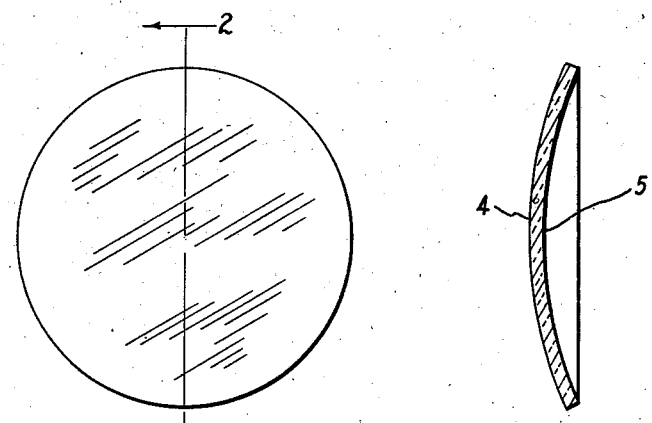
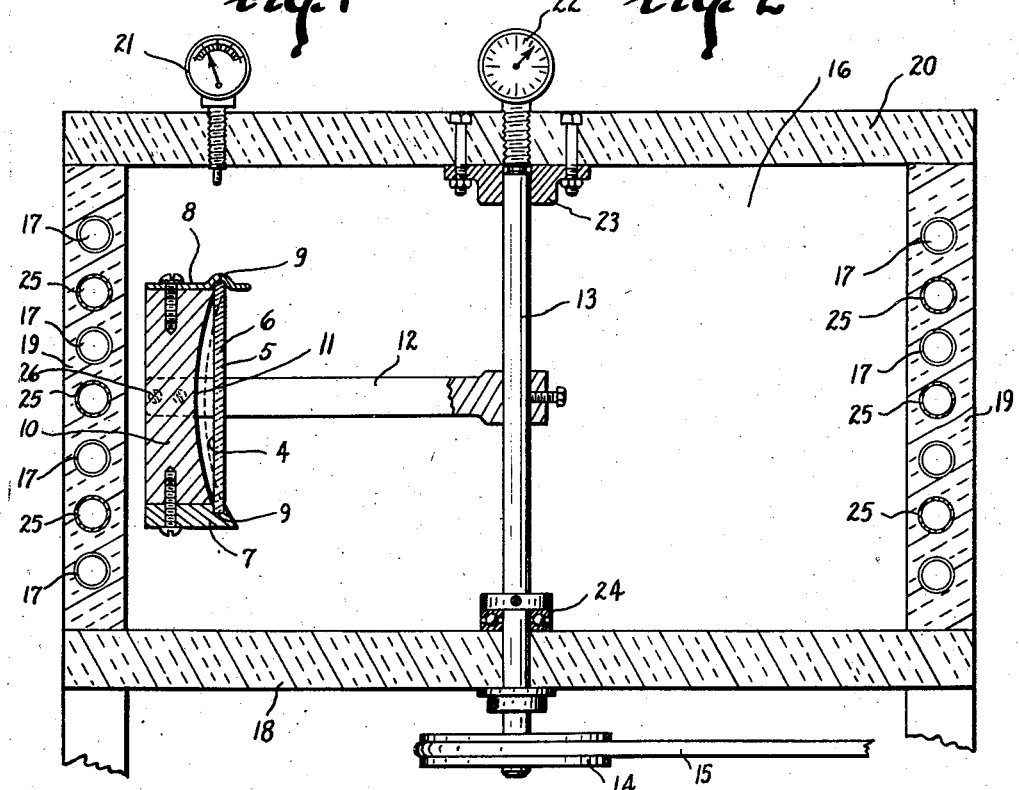
INVENTOR.
WILLIAM J. JOYCE
BY
ATTORNEY Patented Oct. 28, 1947

2,429,692

UNITED STATES PATENT OFFICE 2,429,692

METHOD OF MAKING OPHTHALMIC LENSES

William J. Joyce, Sturbridge, Mass., assignor to American Optical Company, Southbridge, Mass., a voluntary association of Massachusetts Application September 22, 1943, Serial No. 503,323

2 Claims. (Cl. 18—56)

This invention relates particularly to the provision of a novel method of altering the shape of an article through the subjecting thereof to heat and shape altering force.

One of the principal objects of the invention is to provide a novel method of altering the shape of the article by subjecting said article to heat and centrifugal force.

Another object is to alter the shape of a prefabricated article by a given controlled amount by subjecting said article to heat and centrifugal force controlled so as to impart the shape desired to said article.

Another object is to provide a novel method of forming inexpensive lenses such as are used in eye protection devices.

Another object is to provide a novel method of altering the shape of an article through the use of a shape controlling die or mold whereby the article will more positively assume the shape of said die or mold.

Other objects and advantages of the invention will become apparent from the following description taken in connection with the accompanying drawings and it will be apparent that many changes may be made in the steps and methods shown and described without departing from the spirit of the invention as expressed in the accompanying claims. I, therefore, do not wish to be limited to the exact methods shown and described as the preferred forms only have been given by way of illustration.

Referring to the drawings:

Fig. 1 is a face view of an article formed according to the invention;

Fig. 2 is a sectional view of the article shown in Fig. 1 taken as on line 2—2 and looking in the direction indicated by the arrows;

Fig. 3 is a diagrammatic sectional view illustrating the method embodying the invention.

The broad idea of subjecting an article to heat and causing said article to assume the shape of a forming die is not new in the art. The usual prior art practice has been to support the article on the surface of a die having the shape desired of the resultant article and of subjecting the assembly to heat of an amount sufficient to permit said article to drop under the action of gravity and assume the shape of the surface of the die. Considerable difficulty has been encountered in this process in controlling the heat whereby it will be of a sufficient amount to permit the article to drop under the action of gravity and yet prevent said article from becoming distorted or flowing in a sidewise direction whereby the thickness of the article will be altered. The usual prior art procedure therefore required careful temperature control and prior knowledge of the melting point of the material from which the article is formed.

The present invention is directed particularly to overcoming the above difficulty through the provision of means for positively forcing the article to assume the shape desired with the elimination of careful temperature controls as was required by the known prior art methods.

Referring more particularly to the drawings wherein like characters of reference designate like parts throughout the several views, for ease in describing the invention let us assume that the article to be formed is a lens such as shown in Figs. 1 and 2. It is to be understood that the article may be of any type desired which is formed of the material which may be heated and altered as to shape.

The lens illustrated in Figs. 1 and 2 is of the type used in protection goggles or the like to be worn before the eyes and which has no particular power or refractive value. This is due to the fact that the opposed surfaces 4 and 5 are substantially parallel with each other as illustrated in Fig. 2. The said surfaces 4 and 5 are preferably finished optical surfaces initially formed on a flat piece of glass or other material capable of being heated and altered as to shape such as shown at 6 in Fig. 3. The flat piece of glass 6 is preferably initially surfaced by grinding and polishing to produce the desired opposed optical surfaces 4 and 5 thereon. The plate is formed to the contour shape and size desired and is such as to fit within suitable holding members 7 and 8 which are each provided with a slotted portion 9 adapted to receive the contour edge of the article 6. The said holding members 8 are preferably in the form of spring fingers which will permit said holding members 8 to be moved clear of the peripheral edge of the article whereby said article may be easily placed within or removed from the holding member. It is to be understood that a plurality of said holding members 7 and 8 are provided throughout the contour edge of the article.

The said holding members 7 and 8 are carried by a suitable forming die 10 having a surface 11 of the shape desired of the resultant article. The surface 11 may be provided with an optical finish in which instance the surface 4 need not necessarily be initially formed with said optical finish but may assume said finish while being altered to the finished shape desired. This is brought about by supporting the die 10 on an arm 12 carried by a vertical shaft 13. The arm 12 is secured to the shaft 13 and, together with the die 10, is adapted to be rotated simultaneously to the rotation of the shaft 13. The shaft 13 is provided with a pulley 14 connected through a suitable belt or the like 15 to a source of power not shown.

The shaft 13 is supported internally of a chamber 16 having suitable heating units 17 such as electrical coils or the like for generating a desired amount of heat internally of the chamber 16.

The chamber 16 comprises a base 18 having side walls 19 and a top 20. The said base 18, side walls 19 and top 20 are preferably formed of insulation material such as asbestos, clay or the like or may be formed of metal having linings of said insulation material.

The temperature, internally of the chamber 16, is controlled through the provision of a suitable temperature gauge 21 and the speed of rotation of the shaft 13 may be controlled through the provision of a suitable speed gauge 22 connected with said shaft 13. It is to be understood that the source of power is to be such that the speed of rotation of the shaft may be varied as is commonly known.

The shaft 13 is supported adjacent the upper end thereof in a bearing 23 and adjacent the lower end thereof is supported by a ball or roller bearing 24.

The side walls of the chamber may also be provided with cooling coils 25 such as pipe lines through which a suitable refrigerant may flow. The said cooling coils 25 are shown as being in staggered relation with the heating coils 17 but it is to be understood that said heating coils and cooling coils may be placed in any desired relation with each other and with the chamber and that suitable means is provided for turning on or shutting off said coils as desired.

It is to be understood that the dies 10 are interchangeably supported by the arm 12 and may be provided with any surface shape 11 desired. It is also to be understood that a plurality of such arms 12 and dies 10 may be supported on the shaft 13 to be simultaneously rotated. The steps of the method are substantially as follows:

The article 6 to be altered as to shape is preferably provided with the opposed parallel surfaces 4 and 5 of the type of finish desired of the resultant article. In this particular instance, the article is a lens and is preferably provided with finished optical surfaces on the opposed sides thereof. The initial thickness of the article is controlled according to the finished thickness desired of said article. In the initial state, the article 6 is commonly known as a blank and in this particular instance is formed of glass having the opposed optically finished surfaces 4 and 5 thereon. The said blank is controlled as to size and shape so as to fit within the holding members 7 and 8. A die 10 having the surface shape 11 required is secured to the arm 12 by any desirable attachment means 26. The blank or article 6 to be altered is preferably initially formed flat with the surfaces 4 and 5 in substantially parallel relation with each other. It is first placed within the holding members 7 and 8 so as to be supported in aligned relation with the surface 11 of the die. The coils 17 are then turned on and power is imparted to the shaft 13 to rotate the said die and supported article 6. The speed of rotation is controlled according to the amount of centrifugal force desired to be imparted to the article. It will, of course, be understood that the faster the article and die is rotated, the greater the centrifugal force. This centrifugal force may be determined by observing the speed of rotation as indicated by the speed gauge 22.

The amount of heat generated in the chamber 16 is controlled to the extent that it is sufficient to heat the material of the article by an amount which will permit it to respond to the centrifugal force and cause it to intimately assume the shape of the surface 11 of the die.

Care is exercised, however, in controlling the temperature internally of the chamber so that it is not sufficient to cause the material of the article to become liquefied to the extent that the said material will flow and become distorted. The heat is properly controlled so as to be of an amount substantially only sufficient to soften the material and permit it to respond to the centrifugal force.

When the article or blank 6 has been caused to assume the shape of the die surface 11, the coils 17 are shut off and the article is then allowed to cool. The cooling action may be hastened by causing a suitable refrigerant to flow through the pipe lines 25.

It is to be understood that although applicant has described the altering of the shape of a blank which is initially flat and provided with substantially parallel surfaces, the said blank may be of any desired initial shape and may be altered to any desired shape depending upon the type of forming die or surface shape of die used.

It is also to be understood that surfaces of compound curvature may be formed instead of forming a spherical surface such as indicated by the shape of surface 11, that is, a surface having different curvatures throughout different portions of the area thereof might be formed or surfaces of cylindrical, toric, atoric, aspherical, or any other desired shape might be formed.

It is also to be understood that materials other than glass might be used, as for example, plastic or artificial resinous materials which will respond to heat treatment might be used.

It is to be understood that in cases where the article is to be shaped with spherical surfaces or to a resultant meniscus shape, the engagement surface 11 may be omitted from the device so that only suitable holding members similar to the holding members 7 and 8 are required. In such an instance, the heat and centrifugal force, together with the duration thereof, will be controlled so as to cause the blank to assure the meniscus shape desired.

From the foregoing description, it will be seen that simple, efficient, and economical methods have been provided in accomplishing all of the objects and advantages of the invention.

Having described my invention, I claim:

1. The method of forming a curved lens comprising forming a blank of transparent thermoplastic material with finished optical surfaces on the opposed sides thereof and to a controlled thickness which is substantially that which the finished lens is to have, and with the shape of said initial surfaces of the blank being controlled according to the resultant lens shape desired, forming a block with a molding cavity in one side thereof having an inner optically finished surface of a shape controlled according to the final shape desired of the lens, supporting said block internally of a heating chamber and for movement in a circular path about a fixed axis in said chamber with the surface of the cavity of said block disposed in the direction of a plane that is substantially perpendicular to a line extending from the center of the cavity surface and intersecting the axis of revolution at substantially right angles thereto, releasably retaining said blank in superimposed relation with the optically finished surface of the cavity and in between said surface and the axis of revolution, subjecting said blank to heat of an amount sufficient to condition it to respond to a given centrifugal force and causing said block and said heated blank, while held in superimposed relation with the molding cavity of said block, to be rotated at a speed sufficient to introduce centrifugal force of an amount to cause the heated material of said blank to move into engagement with the finished optical surface of the cavity and thereby cause the inner surface of the blank to assume the shape of said cavity surface and to simultaneously form an opposed outer surface on the blank to a shape which is controlled by the shape of the cavity surface, the initial thickness of the blank and the initial shape of said outer surface and allowing said blank to cool while in said relation with said cavity surface.

2. The method of forming a lens comprising forming a blank of transparent thermoplastic material with substantially flat parallel finished optical surfaces on the opposed sides thereof and to a controlled thickness which is substantially that which the finished lens is to have, forming a block with a molding cavity in one side thereof having an inner optically finished surface of a shape controlled according to the final shape desired of the lens, supporting said block internally of a heating chamber and for movement in a circular path about a fixed axis in said chamber with the surface of the cavity of said block disposed in the direction of a plane that is substantially perpendicular to a line extending from the center of the cavity surface and intersecting the axis of revolution at substantially right angles thereto, releasably retaining said blank in superimposed relation with the optically finished surface of the cavity and in between said surface and the axis of revolution, subjecting said blank to heat of an amount sufficient to condition it to respond to a given centrifugal force and causing said block and said heated blank while held in superimposed relation with the molding cavity of said block to be rotated at a speed sufficient to introduce centrifugal force of an amount to cause the heated material of said blank to move into engagement with the finished optical surface of the cavity and thereby cause the inner surface of the blank to assume the shape of said cavity surface and the opposed outer surface to simultaneously conform substantially to said shape, and allowing said blank to cool while in said relation with the cavity surface.

WILLIAM J. JOYCE.

REFERENCES CITED

The following references are of record in the file of this patent:

UNITED STATES PATENTS

| Number | Name | Date |
| --- | --- | --- |
| 669,119 | Krank | Mar. 5, 1901 |
| 1,998,897 | Kay | Apr. 23, 1935 |
| 2,218,654 | Paddock | Oct. 22, 1940 |
| 2,167,539 | Vienneau | July 25, 1939 |
| 2,094,511 | Welch | Sept. 28, 1937 |
| 1,180,383 | Eader | Apr. 25, 1916 |
| 993,555 | Sanford | May 30, 1911 |
| 2,208,230 | Rubissow | July 16, 1940 |
| 2,407,806 | Arnold et al. | Sept. 17, 1946 |